Sept. 26, 1961     W. L. SHEPHEARD     3,001,473
ROCKET CONSTRUCTION
Filed March 26, 1956
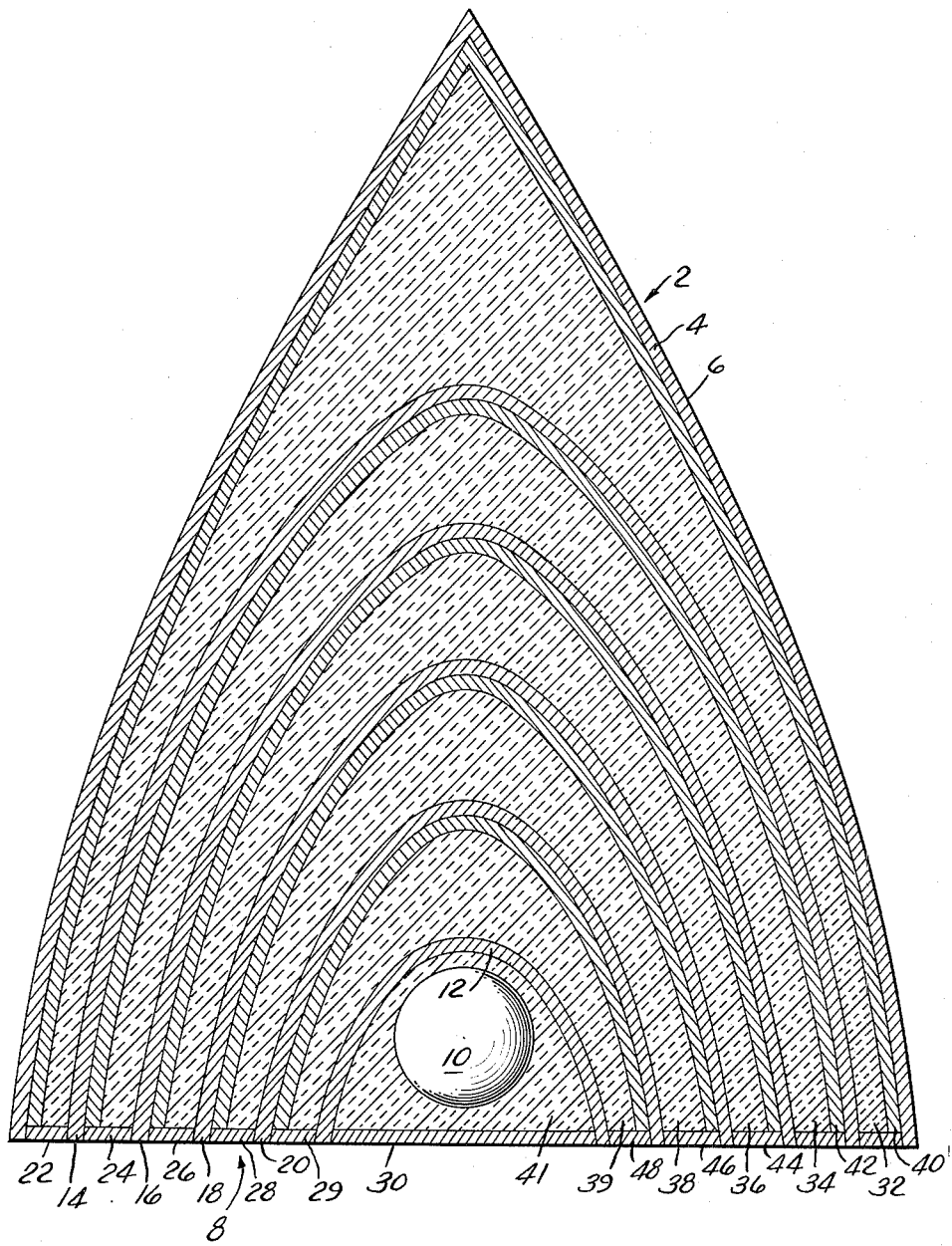
INVENTOR
*William L. Shepheard*
BY *James H. Littlepage*
ATTORNEY United States Patent Office 3,001,473
Patented Sept. 26, 1961

3,001,473
ROCKET CONSTRUCTION
William L. Shepheard, 3040 Broad Creek Road,
Norfolk, Va.
Filed Mar. 26, 1956, Ser. No. 573,948
6 Claims. (Cl. 102—49)

This invention relates to rockets and the like missiles and, more particularly, to missiles fired upwardly through the earth's atmosphere to the outer limits thereof and which, upon return towards the earth, must penetrate and pass through the relatively dense portion of the earth's atmospher at high velocity.

The primary object of the invention is to provide a rocket, or rocket head, capable of withstanding the tremendous heat generated by penetrating and passing through the denser portions of earth's atmosphere. Throughout the ensuing specification and claims the term "rocket" is intended to cover any missile, however shaped or propelled, and it is to be understood that the term covers whatever part, such as the nose or head, of a rocket remaining after other portions, or stages, have been discarded. The term "atmosphere" is intended to cover that region above a planet, such as the earth, whose properties of density and gaseous make-up are such as to cause the generation of intense heat when traversed by a rapidly moving body.

From available data, it is apparent that a rocket fired from the earth will not, during ascent through the atmosphere, encounter its greatest frictional or shock-wave heating effects because its velocity is still comparatively low while it is passing through the denser portion of the atmosphere, and, as the velocity increases, the atmosphere thins out so as to decrease the frictional heat. However, as the rocket descends, its velocity is at or near its maximum, and it has been estimated that the frictional heat generated at the surface of some of the rockets heretofore planned may be greatly in excess of 4,000° F., and, in any event, well beyond the melting point of any known materials capable of serving as a rocket shell or body. Thus, it has heretofore been expected that a rocket capable of flying at the outer limits or beyond the atmosphere will, upon descent, disintegrate because of the generated heat, much in the manner of most meteors. While it is expected that instruments or explosives (hereinafter defined broadly as instruments) contained within the rocket will withstand the temperatures generated during ascent through the atmosphere, it is expected that the instruments will disintegrate, along with the head or remaining portion of the rocket, during descent. The object of this invention is to provide a structure capable of delivering instruments through the atmosphere during descent of a rocket.

It has been reasonably established that the best shape for a rocket nose, from the standpoint of penetrating and passing into the denser portion of the atmosphere, is conical, or somewhat the shape of a pencil-point, but with the cone sides slightly convex. Such a shape is most capable of penetrating the atmosphere, of withstanding the impact of collision with the atmosphere, and will produce shock waves least damaging to itself. However, from the standpoint of heat generation and transmission of heat to the instruments incased within the rocket, the conical shape best suited to penetrate the atmosphere is not desirable, the best shape for this objective being spherical or hemispherical, with the convex side forward. A basic characteristic of a spherical body falling freely through atmosphere is that the frictional heat generated by contact with the atmosphere varies inversely with the square of the radius of the body. The larger the body, the less heat generated. Thus, according to the invention, it is intended to provide a rocket body initially of that shape most suited aerodynamically for penetrating the atmosphere, but changing form, as it descends, to that most desirable for minimum production of heat.

Furthermore, a sphere provides the optimum volume-to-surface ratio and thus has the least amount of exposed surface for the most amount of interior space. Since the amount of exposed surface bears importantly on the amount of heat generated and transmitted to the interior of a body falling through the atmosphere, it is apparent that a spherical container for the instruments would be desirable, were it not for the fact that its shape would be poorly suited for penetrating the atmosphere.

In attaining the objects of the invention, it is now proposed to provide a rocket body having a spherical or hemispherical nucleus for containing instruments, and a plurality of relatively spaced outer shells, each more nearly approaching a cone shape, progressing from the inner to the outer shells, and layers of fibrous insulating material between the shells. By this arrangement, it is intended that, upon entering the denser portion of the atmosphere, the outermost shell will burn off, the underlying layer of fibrous insulation will break-away to expose the next innermost shell which, in turn will burn off to expose the next layer of insulation, and so on until the spherical or hemispherical nucleus is exposed. Meanwhile, the atmosphere will have been penetrated, and the velocity impeded so that, by the time the outer shells and insulation have burned and broken away, the spherical or hemispherical shape suited best from the standpoint of minimum heat generation at the exterior and transmission to the interior will be exposed. The terms "spherical" and "hemispherical" are both used since it is contemplated that the nucleus, instead of being ball-shaped, may be formed as a half-ball, with the convex side disposed forwardly in the rocket body. Insofar as concerns the forwardly exposed surface of the nucleus, minimum heat generation is obtained by either the spherical or hemispherical shapes.

The results intended by the invention is that the maximum temperature developed within the nucleus at any given instant shall be substantially less than that at which the metal or metals of the shells will melt, the effect being to control and limit the heat in the nucleus.

These and other objects will be apparent from the following specification and drawing, in which the sole figure is a vertical cross-section of a rocket head incorporating the invention.

Referring now to the drawing, the head denoted by the numeral 2 is adapted to form the front end of a rocket, it being understood that one or more sections are disposed rearwardly of the head for containing propulsion equipment and fuels.

During flight, the rear sections may be broken away after their usefulness has been fulfilled.

Rocket head 2 is formed with an outer shell 4 having a generally conical forwardly disposed exterior surface 6, it being understood that the specific configuration, while being elongate and tapering forwardly, may be suitably curved for the best aerodynamic properties from the standpoint of penetrating dense layers of atmosphere. A characteristic of this forwardly tapering shape, however, is that it generates high heat, and has comparatively large surfaces in proportion to the contained volume.

The rear end of head 2 is provided with a transverse wall 8, centrally of which is mounted a nucleus 10 having a semi-spherical forwardly disposed exterior shield 12. Nucleus 10 constitutes a container for instruments, explosives, or other matter to be transported by the rocket and delivered at or near the earth's surface after high trajectory. The shield of nucleus 10 is formed of metal or the like rigid material capable of withstanding at least as much heat as the instruments therewithin.

Supported in spaced relationship between outer shell 4 and nucleus shield 12 are a plurality of intermediate shells 14, 16, 18 and 20. For purposes of illustration, the intermediate shells are shown as supported on the transverse rear wall 8, it being understood that suitable spacing supports, not shown, may be provided between the shells, and that the rear transverse wall is to be formed as a series of concentric annuli 22, 24, 26, 28, 29, and a disc 30 so that, when an outer shell breaks away, an adjacent portion only of the transverse wall 8 will disintegrate with it.

Packed between the concentric shells are layers of insulating material 32, 34, 36, 38, 39 and 41 formed of glass fibers or the like fibrous material characterized by its capability of withstanding temperatures in the range of 3,000° F. The voids in the insulating material filling the inter-shell spaces are preferably charged with an inert gas, such as argon, neon or xenon, preferably at considerable pressure so as to exert outward forces on the inner surfaces of the shells contra to the inwardly exerted forces resulting from impact with the atmosphere.

While only four intermediate shells and four layers of insulation have been illustrated, it is within the scope of the invention to utilize many more such intermediate shells, depending on the diameter and length of the outer shell 4, the diameter of nucleus 10, and the heat withstanding characteristics of the metal used for the shells. If the shells be formed of iron, steel, nickel or the like metal capable of withstanding heat in excess of 2,000° F., fewer shells will be needed, but the heat developed and transmitted to nucleus 10, while considerably less than the melting temperature of the shells, will nevertheless be considerably higher than if the shells be formed of aluminum, silver or copper which will melt and disintegrate at temperatures of the 1,000° to 1,900° F. order.

In operation, the assembly remains intact during descent through the thinner outer regions of the atmosphere, and during initial penetration of the denser layers of atmosphere. However, as soon as the skin of outer shell 4 reaches the melting point of the metal from which it is formed, outer shell 4 melts and disintegrates, taking with it annulus 22 forming the outer part of transverse wall 8. The outermost layer 32 of fibrous insulating material immediately disintegrates, thus exposing the outermost intermediate shell 14 which, as will be apparent from the drawing, has a somewhat more rounded front end than did outer shell 4. Meanwhile, however, the rocket has been slowed so that a somewhat less pointed front end is satisfactory from the standpoint of impact with the atmosphere, and is more desirable from the standpoint of heat generation. Shortly after departure of outer shell 4 and insulating layer 32, intermediate shell 14 will burn off, taking with it annulus 24 and insulating layer 34. As the rocket descends, the intermediate shells and insulating layers burn off and disintegrate, thus producing a gradual change in the shape of the forwardly exposed surfaces, thereby gradually decelerating the rocket.

In order to provide uniform distribution of the heat throughout any given shell, inner layers of metal 40, 42, 44, 46 and 48 are provided on the inner sides of the shells, these being particularly needed if the shells be formed of iron, steel or the like metal having poor thermal conductivity. The inner layers being of aluminum, copper, silver, or similar good heat conducting metal, distribute the heat and prevent localized burn-out at hot spots formed, as at the front, of a shell.

In order to provide complete disposition of a shell once the melting point of its metal is approached, it is within the scope of the invention to form each of the shells of several separable parts welded together, the weld metal having a slightly lower melting point than the metal of the associated shell. Thus, immediately before the shell metal melts, the seams will melt, thus allowing the sections of the shell to fly apart.

The invention is not limited to the specific form and structure diagrammed and described hereinbefore, but is intended to cover all substitutions, modifications and equivalents within the scope of the following claims.

I claim:

1. In a rocket, a front portion comprising an outer shell of metal, having a forwardly disposed outer surface of substantially conical configuration, a nucleus for containing instruments centrally disposed within the outer shell, said nucleus having a forwardly disposed surface of semi-spherical configuration, a plurality of metallic intermediate shells of graduated size disposed between the outer shell and said nucleus, said intermediate shells being spaced from one another, and fibrous insulating material respectively disposed between at least some of said intermediate shells and the next outwardly succeeding shells.

2. The combination claimed in claim 1, said intermediate shells also being of graduated shape, the outermost of the intermediate shells have a rounded forwardly disposed exterior surface approaching that of the substantially conical exterior outer shell, the innermost of the intermediate shells having a rounded forwardly disposed exterior approaching the semispherical forwardly disposed surface of the nucleus.

3. The combination claimed in claim 1, the spaces between said shells being charged with inert gas.

4. The combination claimed in claim 1, at least some of said shells being formed of metal characterized by comparatively high thermal conductivity and low melting point.

5. In a rocket, a front portion comprising an outer shell of metal having a forwardly disposed outer surface of elongate forwardly tapering configuration, a nucleus for containing instruments centrally disposed within the outer shell, said nucleus having a forwardly disposed surface of semi-spherical configuration, a plurality of metallic intermediate shells of graduated size disposed between the outer shell and said nucleus, said intermediate shells being spaced from one another, and fibrous insulating material respectively disposed between at least some of said intermediate shells and the next outwardly succeeding shells.

6. The combination claimed in claim 5, the outermost of said intermediate shells being forwardly tapered but somewhat more rounded at its forward end, said intermediate shells having forward ends progressively increasing in roundness towards the innermost one.

References Cited in the file of this patent

UNITED STATES PATENTS

| | | |
|---|---|---|
| 399,881 | Graydon | Mar. 19, 1889 |
| 608,125 | Hurst | July 26, 1898 |
| 757,825 | Maul | Apr. 19, 1904 |
| 847,198 | Maul | Mar. 12, 1907 |
| 1,376,316 | Chilowsky | Apr. 26, 1921 |
| 1,626,655 | Woodson | May 3, 1927 |
| 2,039,372 | Wickmann | May 5, 1936 |
| 2,439,137 | Keller | Apr. 6, 1948 |
| 2,782,716 | Johnston | Feb. 26, 1957 |

FOREIGN PATENTS

| | | |
|---|---|---|
| 554,856 | Great Britain | June 30, 1943 |
| 554,833 | Great Britain | July 21, 1943 |
| 1,084,211 | France | July 7, 1954 |

OTHER REFERENCES

Insulating Effect of Successive Air Spaces Bounded by Bright Metallic Surfaces, by L. W. Schad, published in Heating, Piping, and Air Conditioning Journal in November 1930.